United States Patent Office 3,308,076
Patented Mar. 7, 1967

3,308,076
POLYAMIDES PRODUCED FROM POLYEPOXIDES, DIMERIC FATTY ACIDS AND POLYAMINES
Ernest De Lia, deceased, late of Brooklyn, N.Y., by Lucy De Lia, administratrix, Brooklyn, N.Y., Walter R. Pepis, Cincinnati, Ohio, Daniel J. Carlick, Berkeley Heights, N.J., and William J. Kissel, New York, N.Y., assignors to Interchemical Corporation, New York, N.Y., a corporation of Ohio
No Drawing. Original application July 28, 1961, Ser. No. 130,218, now Patent No. 3,207,653, dated Sept. 21, 1965. Divided and this application June 1, 1965, Ser. No. 470,659
2 Claims. (Cl. 260—18)

This invention relates to new polyamides and to adhesives made therefrom. More particularly it relates to polyamides made by first reacting epoxy resins with dibasic acids so that about one-half the carboxyl groups are unreacted and then reacting these compounds with polyamines, and to adhesives made from these polyamides.

This is a divisional application of Serial No. 130,218, filed July 28, 1961.

The new polyamides of this invention are prepared by a two-stage process in which one equivalent of epoxy resin is reacted with two equivalents of dibasic acid in the presence of a minor amount of a tertiary amine so that about one-half the carboxyl groups are unreacted, the epoxy groups have all reacted, and the terminal groups of the resulting product are carboxyl groups. This polybasic acid is then reacted with a polyamine to give a polyamide, which may be linear or branched depending upon the type of polyamine chosen. The polyamides obtained in the various embodiments of the invention include viscous liquids, semi-solids, hard solids, and rubbery masses, all soluble in suitable solvents. They may have amine numbers in the range of about 0–200 and acid numbers ranging from about 0 to about 10.

Resinous epoxides available commercially that may be used for reaction with the dibasic acids include butadiene-1,3-diepoxide, diglycidyl ether, vinyl cyclohexano-dioxide, Epons, Araldites, Novolacs, etc. The resinous epoxides prepared by reacting a dihydric phenol with epichlorohydrin in the presence of alkali are especially preferred in the present invention. More particularly, the resinous epoxides found to be most effective are those having an epoxide equivalent between 175 and 1,025 and which are made by reacting 2,2-bis(hydroxyphenyl) propanes, especially 2,2-bis(4-hydroxyphenyl) propane or commercial mixtures of this isomer with lesser quantities of the other isomers such as 2,2-bis-(2-hydroxyphenyl) propane, e.g. bisphenol A in the presence of alkali. The preferred resinous epoxides are commercially available under the trade name "Epon," for example. These polymers are believed to comprise alternate aliphatic chains derived from epichlorohydrin and aromatic nuclei derived from bisphenols connected by ether linkages, each terminal aliphatic chain containing an epoxide group and each interior aliphatic chain a hydroxyl group.

The organic dibasic acids used preferably should not be contaminated with a large amount of tribasic or monobasic acids. Tribasic acids tend to produce an undesirable amount of crosslinking and monobasic acids an undesirable amount of chain termination. We have found, however, that at least 20% tribasic acid can be tolerated. The dimers of unsaturated fat acids have been found to be particularly suitable. We prefer to use polymerized linoleic acid.

In carrying out the reaction between the resinous epoxide and the organic dibasic acid, each epoxy group reacts with one carboxyl group, the quantities being chosen so that approximately half the carboxyl groups of the dibasic acid remain free. There can be a slight excess of epoxy groups over this requirement. The free carboxyl groups can then be reacted with the polyfunctional amines to form the polyamides of this invention. The typical reaction which takes place between the epoxide groups and the organic dibasic acid may be illustrated by the reaction between the Epon and a dicarboxylic acid.

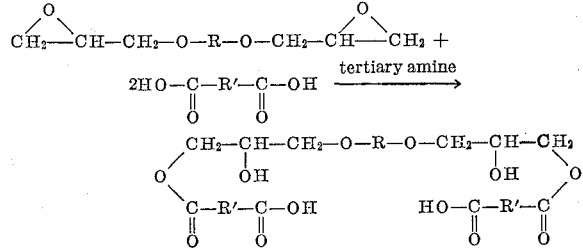

where R is an aromatic nucleus and R' is an aliphatic chain or an aromatic nucleus. This reaction takes place readily at temperatures around 100° to 130° C. The use of relatively low reaction temperatures is desirable to minimize the degree of esterification of hydroxyl groups, forming crosslinkages.

It has been found that certain substances which catalyze the opening of the oxirane ring will promote the desired reaction and reduce the tendency towards gelation produced by undesirable side reactions. Particularly effective as catalysts are tertiary amines, especially N,N-dimethylbenzylamine. Carrying out the reaction in an inert atmosphere is also strongly recommended for avoiding premature gelation through the participation of oxygen in the reactions.

To obtain the resinous polyamides of this invention the new dicarboxylic acids described above are reacted with polyfunctional primary aliphatic amines having the formula $H_2N(RNH)_nH$, where R is an alkylene radical and $n$ is an integer less than 6 i.e., 1 to 5, these amines having free amino groups. Examples of such compounds are ethylene diamine, triethylene tetramine, diethylene triamine, tetraethylene pentamine, etc.

Suitable unsaturated fat acids for preparing the epoxylated polycarboxylic acids of this invention are the preponderantly dimeric polymers of drying or semi-drying oils or similar polymerization products made from the free fat acids or lower alkyl esters of the fat acids of such oils, particularly the methyl or ethyl esters.

The ingredients used in this invention are described in the following list.

Epon 815 is a liquid Bisphenol A epichlorohydrin resin having an epoxide equivalent of 175 to 210.

Epon 828 is a Bisphenol A epichlorohydrin resin having an epoxide equivalent of 180 to 195, a melting point of 8 to 16° C., and a Gardner-Holdt viscosity of Z5 to Z6+.

Epon 1001 is a Bisphenol A epichlorohydrin resin having an epoxide equivalent of 425 to 550, a melting point of 64 to 76° C., and a Gardner-Holdt viscosity of C to G.

Epon 1004 is a Bisphenol A epichlorohydrin resin having an epoxide equivalent of 875 to 1025.

Bisphenol A is bis(4-hydroxyphenyl) dimethyl methane.

Mylar is the polymeric reaction product of ethylene glycol and terephthalic acid.

The Empols are sold by Emery Industries, Inc. Emery 3079S is a mixture of about 95% dimer and about 5% trimer of pure linoleic acid. Empol 1022 is a mixture of about 80% dimer and 20% trimer of technical linoleic acid.

The following examples, in which the parts are parts by weight, illustrate the preparation of the difunctional acids and the novel polyamides of this invention.

*Example 1.*—Under a blanket of nitrogen 243.5 parts of Epon resin 1001 were reacted with 295.9 parts of Emery 3079S for ½ hour at 120 to 125° C. 1.45 parts of N,N-dimethylbenzylamine was added and the reaction continued until an acid value of 54.8 was attained. 55 is the theoretical acid value for the product desired. The material was a clear, light-colored, semi-solid resin.

*Example 2.*—193 parts of Epon resin 828 were similarly reacted with 590 parts of Empol 3079S at 115° C. After adding 1.14 parts of N,N-dimethylbenzylamine, the reaction was continued until an acid value of 75 was attained.

*Example 3.*—200 parts of the resin prepared in Example 2 were used. 36.8 parts of triethylene tetramine were added to a suitable flask. The Example 2 resin was then heated to 50° C. and put in the flask, after which the mixture was heated to 200° C. under a blanket of nitrogen and the reaction allowed to continue until the acid value dropped to 4.5 (about 2 hours). At this point the run was stopped. The product obtained was a viscous, light-colored liquid with an amine value of 113.0.

*Example 4.*—Under a blanket of nitrogen 400.0 parts of the resin prepared in Example 2 were heated to 150° C. and then 17.2 parts of ethylene diamine added slowly. The temperature was raised to 200° C. and the reaction allowed to continue about 6 hours, at which point the acid value had dropped to about 10.5. The product was a semi-solid, light-colored resin having an amine value of 9.4.

*Example 5.*—Under a blanket of nitrogen 442 parts of Epon resin 828 and 1380 parts of Empol 3079S were heated 1 hour to 110° C. 2.6 parts of dimethylbenzylamine were then added and the reaction continued until the acid value dropped to 71 to 75. This generally required 3 to 3½ hours. Into another flask was put 336 parts of triethylenetetramine and stirred rapidly. The contents of the first flask were preheated and added quickly to the amine. The mixture was then heated to 175 to 185° C. in 2 to 3 hours and held there until the acid value reached 4 to 6. Yield was 2102 parts of a semi-solid, rubbery substance having an amine value of 121.0.

*Example 6.*—253.5 parts of Epon resin 815 and 800 parts of Empol 3079S were heated under a blanket of nitrogen at 110 to 120° C. in a suitable flask equipped with a stirrer, condenser, etc. 1.5 parts of dimethylbenzylamine were then added and the reaction allowed to proceed for about 2½ to 4 hours, the acid value dropping to 71. The material was cooled to 25° C. and 137.5 parts of diethylene triamine added. Heating was resumed and continued at about 175° to 195° C. until the acid value dropped to 10.0. The product was an extremely rubbery, amber-colored mass. The yield was 1155 parts of the product.

*Example 7.*—Under a blanket of nitrogen 760 parts of Epon resin 1004 and 480 parts of Empol 3079S were heated to 120° to 148° C. 4.3 parts of N,N-dimethylbenzylamine were then added and the reaction continued for about 2 hours, when the acid value was about 40 (theoretical-36.3). 27.0 parts of ethylene diamine were then added gradually. 50 parts of xylol were added at this point and the temperature slowly raised to 200° to 215° C. and held there for 2½ hours, driving off the xylol. The acid value had then reached 5.1 and the amine value 3.8. The product was a hard, tough resin with a softening point of 116° C. and was soluble in alcohol-hydrocarbon mixtures.

*Example 8.*—Example 6 was repeated, but 360 g. Empol 1022 were used instead of Empol 3079S. The reaction appeared to be similar. The product closely resembled the product of Example 6.

The resinous products of this invention are useful in coatings, inks and adhesives. Illustrative of a valuable application is an adhesive for laminating films of Mylar to films of polyethylene, the laminate being able to withstand immersion in boiling water. Laminates of this kind may be utilized as wrappings for food products that are to be cooked or heated in their bags, particularly frozen foods. Such wrappings should have a peel strength of about 300 to 400 grams per inch (Suter tester), should show no delamination or water blush after immersion for 30 mins. in boiling water, and a very thin coating of adhesive should be sufficient to meet these specifications.

*Example 9.*—A butadiene-acrylonitrile rubber was milled and then dissolved in methyl isobutyl ketone to make a 10% solution. 60 parts of the solution were added to 30 parts of a 20% solution of the resin prepared by the method of Example 3 in 1:1 isopropanol-toluene solvent. 10 parts of methyl ethyl ketone completed the formulation.

*Example 10.*—The resin obtained by the method of Example 6 was dissolved in a 1:1 isopropanol-toluene mixture to make a solution containing 60% solids. This was applied as an adhesive in this form and also in admixture with a butadiene-acrylonitrile rubber solution as in the preceding example.

All the adhesives in Examples 9 and 10 passed the required tests for strength and for boiling water resistance. Drawdowns were made with a wire-wound bar and bonded at 400° F. for 5 to 10 seconds. The peel strength was measured on a Suter tester with a pull rate of 12 inches per minute. The peel strength of the adhesive of Example 10 was 360 to 430 grams alone and 380 to 440 grams when formulated with butadiene-acrylonitrile rubber at coating thicknesses of 0.7 to 1.0 lb. per 1000 square feet. At 0.1 to 0.2 lb. per square foot, the peel strength of the adhesive of Example 10 without the rubber was 330 to 380 grams.

By formulating the adhesives with minor amounts of copolymers of vinyl chloride and vinyl acetate and copolymers of acrylonitrile and butadiene, the physical properties of the adhesives may be varied to fulfill different requirements. As an example, the best adhesion and the best heat resistance were obtained with the formulation: 40 to 100 parts of a 10% solution of carboxy containing butadiene-acrylonitrile, 15 to 30 parts of a 20% solution of the polyamide of Example 7 in a 1:1 toluene-isopropanol solution, and 10 to 30 parts of a 20% solution of a vinyl resin in methyl ethyl ketone. A Mylar-polyethylene laminate made from this adhesive showed a peel strength of 800 grams at a film weight of 0.1 to 0.3 lb./1000 square feet. It also passed the boiling water tests in the laboratory.

What is claimed is:

1. New resinous polyamides comprising products of the reaction between (1) about one equivalent of the polybasic acids obtained as products of the reaction between about one equivalent of a bis(4-hydroxyphenyl) dimethyl methane epichlorohydrin resin having an epoxide equivalent of 175 to 1,025 and about two equivalents of a substance selected from the group consisting of polymerized naturally occurring ethylenically unsaturated higher fatty oils, the polymerized acids of said oils, and the polymerized esters of the acids of said oils with the lower alkyl alcohols and (2) about one equivalent of an alkylene polyamine having the formula $H_2N(RNH)_nH$, where R is an alkylene radical and $n$ is an integer from 1 to 5, said polyamine having free amino groups the reaction product having an amine number in the range of about 0–200 and an acid number of about 0 to 10.

2. The new resinous polyamides described in claim 1 in which the polybasic acids are products of the reaction between a bis(4-hydroxyphenyl) dimethyl methane epichlorohydrin resin and polymerized linoleic acid.

No references cited.

LEON J. BERCOVITZ, *Primary Examiner.*

C. W. IVY, *Assistant Examiner.*